United States Patent
Gurtler

(12) 
(10) Patent No.: US 7,192,045 B2
(45) Date of Patent: Mar. 20, 2007

(54) FIFTH WHEEL TRAILER HITCH

(76) Inventor: Wendell A. Gurtler, 315 Western Ave., Iowa Falls, IA (US) 50126

( * ) Notice: Subject to any disclaimer, the term of this patent is extended or adjusted under 35 U.S.C. 154(b) by 338 days.

(21) Appl. No.: 10/963,169

(22) Filed: Oct. 11, 2004

(65) Prior Publication Data

US 2006/0076753 A1 Apr. 13, 2006

(51) Int. Cl.
*B62D 53/06* (2006.01)
(52) U.S. Cl. ........................ 280/433; 280/439
(58) Field of Classification Search .............. 280/417.1, 280/418.1, 433, 439, 440, 438.1, 483–486
See application file for complete search history.

(56) References Cited

U.S. PATENT DOCUMENTS

| | | | |
|---|---|---|---|
| 5,851,021 A | | 12/1998 | Van Kley |
| 5,964,476 A | * | 10/1999 | Maines .................... 280/433 |
| 6,182,996 B1 | * | 2/2001 | Koetter et al. ............. 280/433 |
| 6,726,396 B2 | | 4/2004 | Plett |

OTHER PUBLICATIONS

B & W; Companion 5th Wheel RV Hitch.
Dethmers Manufacturng Company; The Glider Coupler takes the Jack-Hammer out of a rough road . . . .

* cited by examiner

*Primary Examiner*—Lesley D. Morris
*Assistant Examiner*—L. Lum
(74) *Attorney, Agent, or Firm*—Sturm & Fix LLP

(57) ABSTRACT

A fifth wheel trailer hitch assembly having a torsion bar mounted to a bed of a vehicle, a pair of support arms connected to the torsion bar and extending upwardly, a support beam connected to and extending between the support arms, and a coupling assembly mounted to the support beam.

7 Claims, 3 Drawing Sheets

FIFTH WHEEL TRAILER HITCH

BACKGROUND OF THE INVENTION

The present invention relates to a trailer hitch and, more specifically, a fifth wheel trailer hitch that prevents vibration and other erratic motion from the trailer from transferring to the vehicle during travel.

Wheeled trailers are frequently towed behind vehicles to transport various items including boats, campers, horses, and other cargo. Many types of hitches have been developed to receive and tow a wheeled trailer.

A disadvantage of conventional trailer hitches is that uneven road surfaces cause vibration resulting in wear and damage to the trailer hitch. Additionally, the vibration and erratic motion from the trailer tends to transfer through the hitch to the vehicle, thereby affecting the vehicle's performance. This problem is only exaggerated when the trailer is empty or hauling a light load. When the trailer is unloaded, bumps in the road will cause the trailer to pitch and move in an erratic fashion, pulling the vehicle from side to side.

For fifth wheel trailers, no attempt has been made to solve this problem. Other trailers have been developed that include shock absorbers and other dampening devices for reducing the vibration and erratic motion of the trailer, particularly when the trailer is unloaded. One such example is U.S. Pat. No. 5,887,884 to Smith, which teaches a trailer having a shock absorber. The disadvantage with trailers such as the Smith apparatus is that a consumer must upgrade any conventional trailers to include the shock absorbers taught by Smith. This can be costly, particularly if the consumer has multiple trailers for towing different types of cargo.

U.S. Pat. No. 5,823,560 to Van Vleet addresses the vibration problem by modifying the actual trailer hitch. In this manner, any trailer secured to the Van Vleet device will receive the cushioning effects of the Van Vleet device. The disadvantage with the Van Vleet device is that it requires the use of a complex ball hitch assembly, which is comprised of rigid steel parts. As such, the Van Vleet device provides very limited movement and shock dampening capabilities. Accordingly, there is a need in the art for an improved trailer hitch.

It is therefore a principal object of this invention to provide a fifth wheel trailer hitch that absorbs shock and vibrations from a trailer.

Another object of this invention is to provide a trailer that improves the ride of the towing vehicle by preventing vibration from transferring through a fifth wheel trailer hitch to the vehicle.

A further object of this invention is to provide a trailer hitch with a torsion bar that absorbs vibration and other erratic forces from the trailer.

Yet another object of the present invention is to use a plurality of torsion bars in combination with a fifth wheel hitch in order to absorb vibration and erratic forces from a trailer.

These and other objects, features, or advantages of the present invention will become apparent from the specification and claims.

BRIEF SUMMARY OF THE INVENTION

The present invention is for a fifth wheel trailer hitch assembly. The assembly is mounted on a bed of a vehicle and has at least one torsion bar that extends across the bed of the pickup. The torsion bars have fastening plates attached thereto to secure the assembly to the bed of the pickup. The assembly additionally has a first and second arm attached to the torsion bar and the arms are connected to a support beam that holds the fifth wheel hitch, or central coupling assembly. Optionally, a second torsion bar is placed above and transverse to the first torsion bar and mounted to the coupling assembly, thus allowing for torsion to be absorbed from forces in all directions caused by the trailer.

DESCRIPTION OF THE PREFERRED EMBODIMENTS OF THE INVENTION

Figure 1:
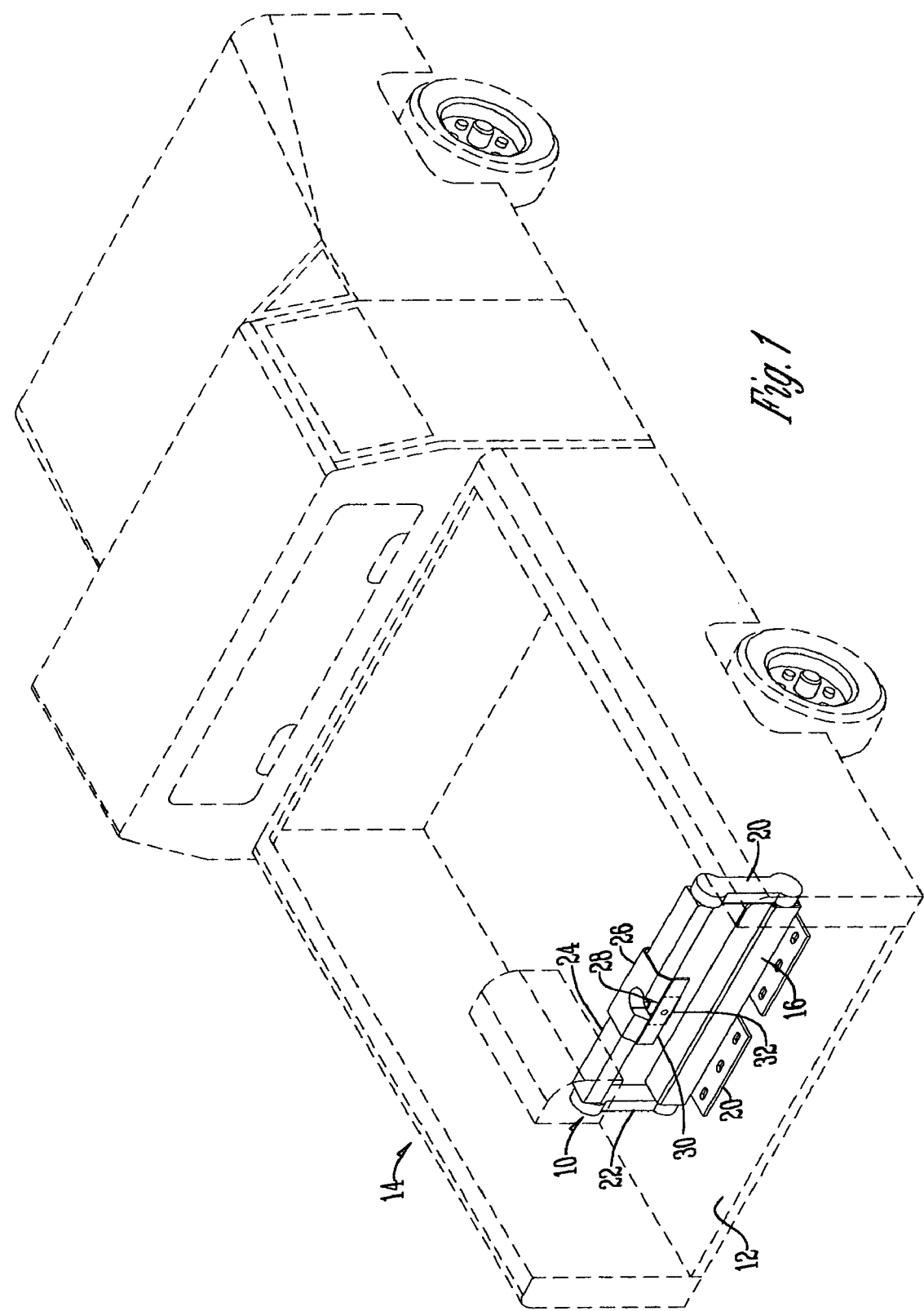
FIG. 1 is a perspective view of a trailer hitch assembly of the present invention.
Figure 2:
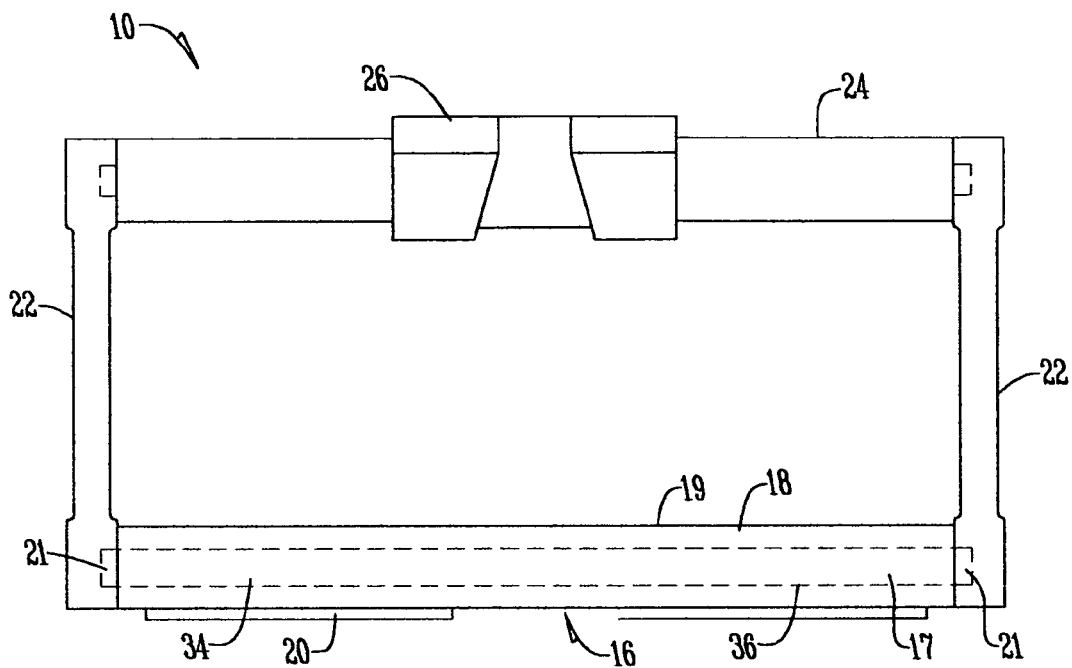
FIG. 2 is a side plan view of the present invention having a single torsion bar.

Referring to the drawings, the fifth wheel trailer hitch assembly is shown generally by the reference numeral 10 and is mounted on the bed 12 of any conventional vehicle 14. The assembly 10 has a torsion bar 16 that extends across the bed of the truck. The torsion bar 16 has a metallic center member 17 and resilient cushioning material 18 surrounding the center member 17. Alternatively, the torsion bar 16 has a housing 19 and the resilient cushioning material, which preferably is made of rubber, is positioned in the spacing between the center member 17 and the housing 19. In an additional embodiment the resilient cushioning material 18 comprises four pieces of generally circular cross section that are compressed to fill the space between the housing 19 and the center member 17.

The torsion bar 16 is connected to a mounting plate 20 in any conventional manner such as a weld. The mounting plate 20 is used to connect the assembly 10 to the bed 12 of the vehicle 14 such as with a plurality of bolts.

The central member 17 of the torsion bar 16 extends beyond the cushioning material to form stubs 21 on each end of the torsion bar 16. Connected to the stubs 21, are a pair of support arms 22 that extend upwardly from the torsion bar 16. The arms 22 are connected to the stubs 21 in any conventional way and preferably the stub 21 has a spline that is received within a keyhole opening in the arm.

Figure 3:
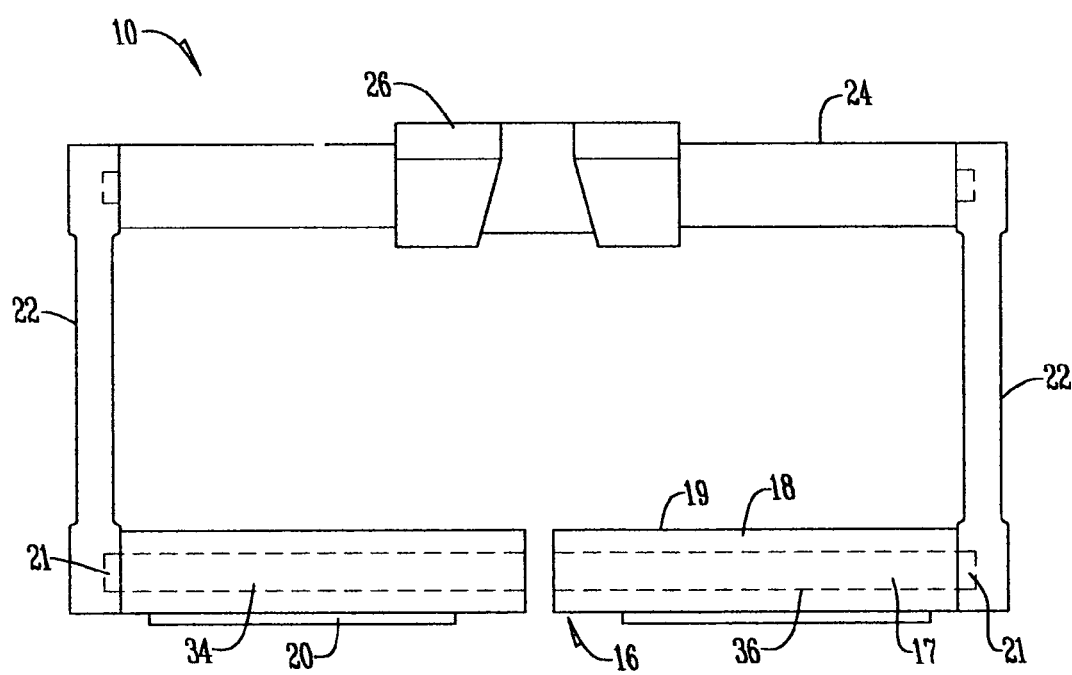
FIG. 3 is a side plan view of the invention having multiple torsion bars.
Figure 4:
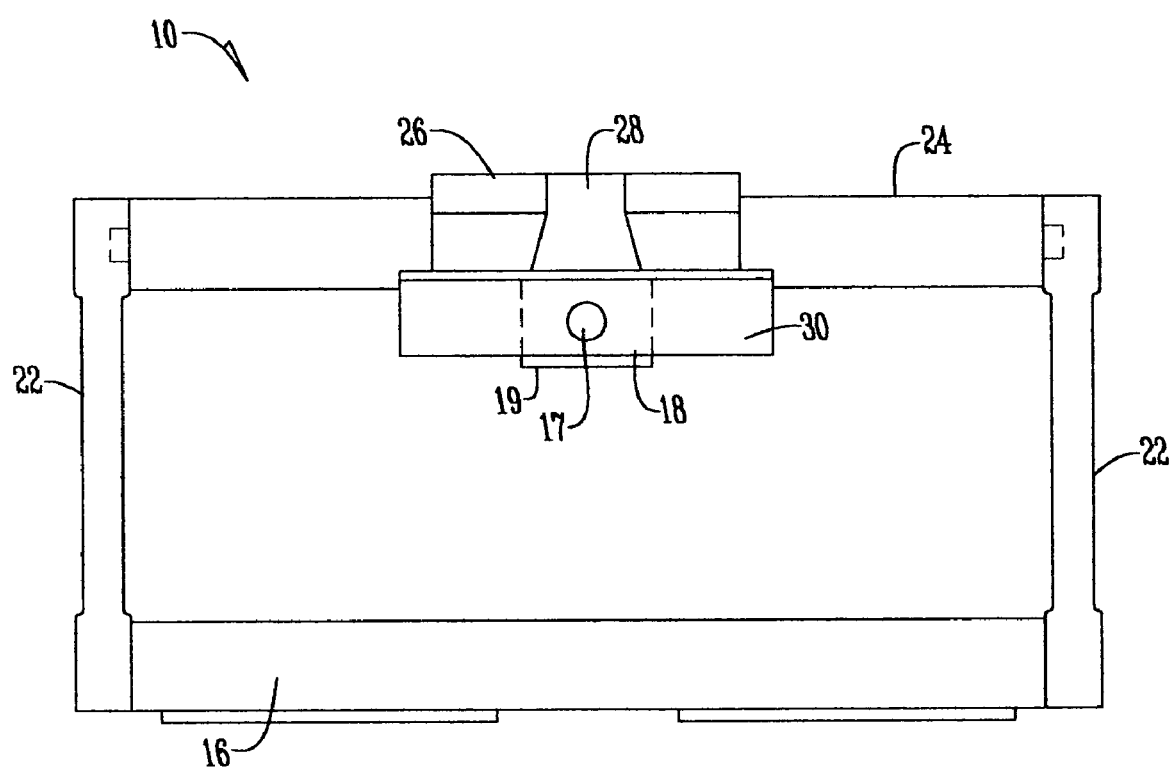
FIG. 4 is a plan side view of the invention having a second torsion bar transverse to the first torsion.

Connected to and extending between the upper end of the support arms 22 is a pivoting support beam 24. Mounted to the support beam 24 is a central coupling assembly 26 having a central opening 28 that receives the fifth wheel of a trailer or the central coupling assembly includes a ball hitch in place of the central opening 28. In one embodiment, as shown in FIG. 4, the central coupling assembly has a pair of connecting plates 30 that extend downwardly toward the bed 12 of the vehicle 14. Mounted to the support beam 24 and extending between the plates 30 is a second torsion bar 32. The second torsion bar 32 is positioned transverse to the first torsion bar 16. Also, the first torsion bar 16 may be separated into two sections 34 and 36 as shown in FIG. 3. In this embodiment, section 34 and 36 operate independently of one another to dampen vibrations from the trailer.

In operation, the assembly 10 dampens the vibration from the trailer and reduces the transfer of the erratic motion from the trailer to the vehicle 14. The dampening is accomplished through use of the torsion bar 16. When the trailer vibrates, the torsion bar 16 absorbs the vibration by rotating slightly which in turn compresses the resilient cushioning material 18. The compression of the resilient material 18 absorbs the vibration and other erratic motion of the trailer particularly in a forward and rearward direction of the vehicle. When the torsion bar 16 is separated into sections 34 and 36, the sections work independently of one another to dampen different vibration and motion, which is particularly useful when cornering. The second torsion bar 32, which is positioned transverse to the first torsion bar 16, absorbs vibration and movement in a side-to-side direction as related to the vehicle. In combination with the first torsion bar 16, the use of the second torsion bar 32 allows the assembly 10 to absorb and dampen the vibration and movement from the trailer in any direction.

From this description, it is therefore seen that this invention meets its stated objectives and provides for the towing of a trailer while reducing vibration and erratic movement.

What is claimed is:

1. A fifth wheel trailer hitch mounted to a bed of a vehicle comprising:

a torsion bar mounted to the bed of the vehicle;

a pair of support arms connected to and extending upwardly from the torsion bar;

a support beam connected to and extending between the support arms; and a coupling assembly mounted to the support beam.

2. The hitch of claim 1 wherein the torsion bar is connected to a mounting plate that is secured to the bed of the vehicle.

3. The hitch of claim 1 wherein the torsion bar is comprised of at least two sections.

4. The hitch of claim 1 wherein a second torsion bar is connected to the support beam.

5. The hitch of claim 1 wherein a second torsion bar is mounted transverse to the torsion bar.

6. The hitch of claim 4 wherein the coupling assembly has a pair of connecting plates secured to the second torsion bar.

7. The hitch of claim 5 wherein the second torsion bar is connected to the support beam.

* * * * *